United States Patent
Cheng et al.

(10) Patent No.: US 8,239,884 B2
(45) Date of Patent: *Aug. 7, 2012

(54) APPARATUS, SYSTEM, AND METHOD FOR ISOLATING A STORAGE APPLICATION FROM A NETWORK INTERFACE DRIVER

(75) Inventors: Tu-An Cheng, Cupertino, CA (US); Jialin Ju, Cupertino, CA (US); John Earle Lindley, San Jose, CA (US); William James Scales, Fareham (GB); Kiron Haltore, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

This patent is subject to a terminal disclaimer.

(21) Appl. No.: 12/142,341

(22) Filed: Jun. 19, 2008

(65) Prior Publication Data
US 2008/0244621 A1 Oct. 2, 2008

Related U.S. Application Data

(63) Continuation of application No. 10/910,681, filed on Aug. 3, 2004, now Pat. No. 7,404,192.

(51) Int. Cl.
G06F 9/44 (2006.01)
G06F 3/00 (2006.01)
(52) U.S. Cl. ............................ 719/326; 705/5
(58) Field of Classification Search .............. 719/326
See application file for complete search history.

(56) References Cited

U.S. PATENT DOCUMENTS

| | | | |
|---|---|---|---|
| 5,889,965 A | 3/1999 | Wallach et al. | |
| 5,987,426 A * | 11/1999 | Goodwin, III | 705/21 |
| 6,047,323 A | 4/2000 | Krause | |
| 6,538,669 B1 | 3/2003 | Lagueux, Jr. et al. | |
| 6,553,408 B1 | 4/2003 | Merrell et al. | |
| 6,594,698 B1 | 7/2003 | Chow et al. | |
| 6,697,875 B1 | 2/2004 | Wilson | |
| 6,718,372 B1 | 4/2004 | Bober | |
| 7,103,626 B1 | 9/2006 | Recio et al. | |
| 2003/0061399 A1 | 3/2003 | Wagener et al. | |
| 2003/0177174 A1 | 9/2003 | Allen et al. | |
| 2003/0179227 A1 | 9/2003 | Ahmad et al. | |
| 2003/0217212 A1 | 11/2003 | Kim | |
| 2004/0054866 A1 | 3/2004 | Blumenau et al. | |
| 2004/0225775 A1 * | 11/2004 | Pellegrino et al. | 710/200 |
| 2005/0223128 A1 * | 10/2005 | Vasudevan et al. | 710/22 |
| 2005/0251540 A1 | 11/2005 | Sim-Tang | |
| 2006/0080420 A1 | 4/2006 | Backman et al. | |

FOREIGN PATENT DOCUMENTS
EP    1100001    5/2001

* cited by examiner

*Primary Examiner* — Andy Ho
*Assistant Examiner* — Abdou Seye
(74) *Attorney, Agent, or Firm* — Kunzler Needham Massey & Thorpe

(57) ABSTRACT

An apparatus and system are provided for isolating a storage application from a network interface driver. The apparatus includes a definition module, an application interface, a translation module, and a data buffer. The definition module defines a set of storage application functions. The translation module translates each storage application function to one or more network interface driver functions. The data buffer transfers data blocks between the storage application and the network interface driver.

26 Claims, 6 Drawing Sheets

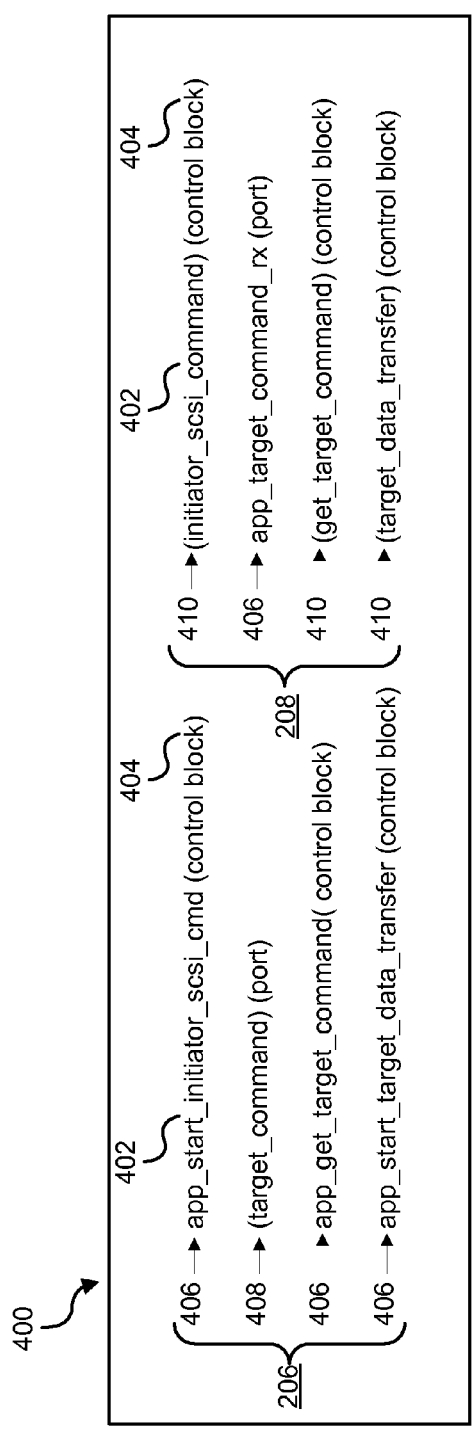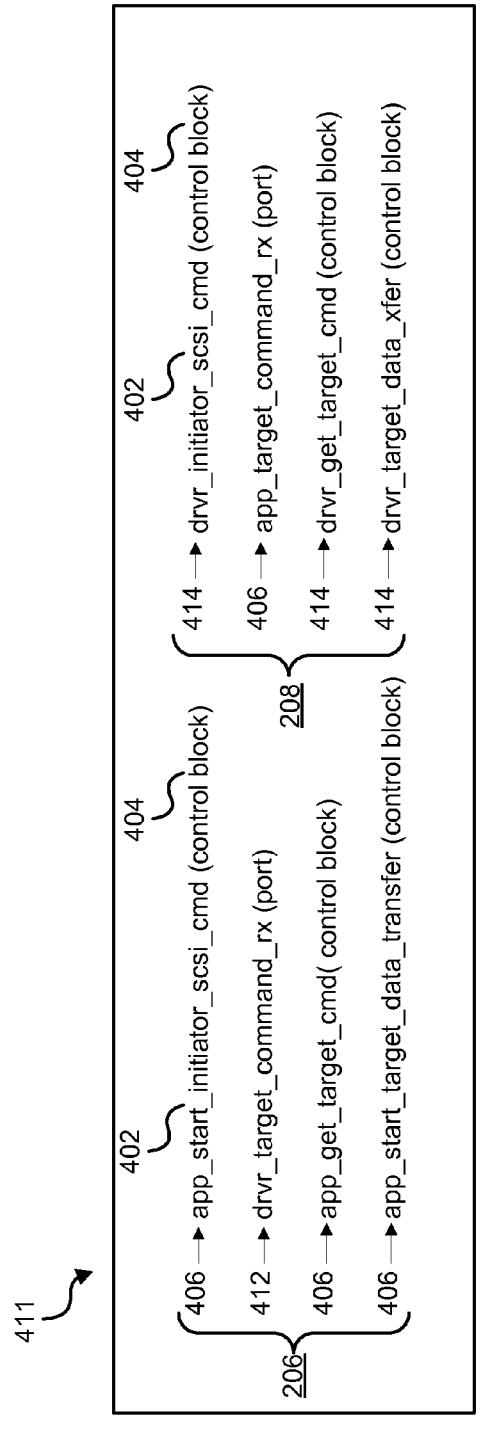
FIG. 4A
FIG. 4B

APPARATUS, SYSTEM, AND METHOD FOR ISOLATING A STORAGE APPLICATION FROM A NETWORK INTERFACE DRIVER

CROSS-REFERENCE TO RELATED APPLICATIONS

This application is a continuation of U.S. patent application Ser. No. 10/910,681 filed on Aug. 3, 2004, Now Pat. No. 7,404,192, entitled APPARATUS, SYSTEM, AND METHOD FOR ISOLATING A STORAGE APPLICATION FROM A NETWORK INTERFACE DRIVER, and claims all rights of priority and incorporation available due to this continuation relationship.

BACKGROUND OF THE INVENTION

1. Field

The invention relates to storage software. Specifically, the invention relates to apparatus, systems, and methods for isolating a storage application from a network interface driver.

2. Description of the Related Art

Early computer systems consisted of a host and a connected storage device located in the same chassis. The host comprised a processor and volatile memory. The storage device was a non-volatile method of storage such as a hard drive, floppy drive, or tape system. As computer systems became more sophisticated a need arose for a protocol to connect multiple storage devices to a single host.

The Small Computer Systems Interface (SCSI) protocol emerged as a popular method of enabling communication between storage devices and a host computer. SCSI devices are typically connected in a chain with a host connected to a first storage device, the first storage device connected to a second storage device, and so on. Each of the devices in the chain is able to communicate with each other. SCSI chains allow the host to access each of the storage devices and also allow storage devices to communicate with each other. The ability for storage devices to communicate directly with each other enables procedures such as backing up a hard drive to a tape.

Recently new storage requirements for computer systems have become apparent. The widespread use of the Internet for examples has created a need for computer systems with large amounts of storage, and little or no tolerance for taking storage devices off line to perform backups. SCSI chains have evolved into storage area networks (SANs) to meet these requirements.

In a SAN, one or more SAN switches connect a plurality of hosts to a plurality of storage devices. The SAN switches, also referred to as a SAN fabric, allow any host to interact with any storage device. The any to any connectivity provided by a SAN enables new storage functionality. For example, multiple hosts may share a common storage device. Additionally, multiple storage devices may be aggregated together to provide a single, large, virtual storage device. SANs also facilitate mirroring of storage device to create backup data without having to take a storage device offline.

A network interface connects each host and each storage device to the SAN. The network interface provides a physical connection to a SAN switch. Typically the physical connector uses fiber optic or copper cables. The network interface uses one or more protocols to communicate with the SAN switch. Typical protocols used in SANs include Fibre Channel, Ethernet, and Internet Protocol (IP). These protocols have been extended to accommodate transporting SCSI commands.

Protocols that enable SCSI commands to be sent over a SAN allow existing storage applications utilizing SCSI commands to operate over a SAN. In addition, storage devices rely on SCSI commands. Transporting SCSI commands over a SAN using an extended protocol makes the SAN transparent to the existing host storage application and storage device. Typical protocol extensions for SCSI commands include Fibre Channel Protocol for SCSI (FCP), which allows SCSI commands to be transported on Fibre Channel networks, and Internet SCSI (iSCSI), which allows SCSI commands to be transported on IP networks.

SCSI defines two types of devices: initiators and targets. Initiators send SCSI commands to a SCSI target to request that data be retrieved from or sent to the SCSI target. Typically hosts are SCSI initiators. Targets receive SCSI commands from a SCSI initiator. As a result of the SCSI command, the target stores data sent to the target by the initiator or sends data stored on the target to the initiator. Typically storage devices are SCSI targets.

SCSI commands that retrieve or store data, as well as SCSI commands that request status information regarding the success or failure of a data transfer may be classified as SCSI control messages. SCSI control messages convey a request for information or data. SCSI control messages do not convey the data itself. SCSI data blocks transport data between an initiator and a target. Storage application use SCSI control messages and SCSI data blocks.

A storage application is software that uses storage commands, such as SCSI commands, to transfer data between the host that the storage application resides on and a storage device. Typically, a storage application does not communicate directly with a network interface. Storage commands from the storage application are sent to software known as a network interface driver. The Network Interface Driver adapts the storage commands to a format suitable for transmission by the network interface on a fiber optic or copper cable.

A storage application typically interfaces with a network interface driver using function calls. The storage application must know the correct function calls to communicate with a particular network interface driver. Coordination of function calls between storage applications and network interface drivers is not difficult in theory; however, practical limitations often prevent proper coordination of function calls.

For example, new SAN protocols have been developed and deployed quickly. In addition to providing new storage functionality, the new SAN protocols typically allow SCSI commands to be transported over the SAN. In some cases, network interface drivers for these new SAN protocols are not compatible with existing storage applications function calls. As a result, the storage application may need modifications to work with the network interface driver to take advantage of the new SAN protocol. Modifying existing storage applications in this manner is costly since modifications must be made each time a new SAN protocol is integrated with the storage application.

From the foregoing discussion, it should be apparent that a need exists for an apparatus, system, and method that isolate a storage application from a network interface driver by providing a software isolation layer with independent interfaces for a storage application and a network interface driver. Beneficially, such an apparatus, system, and method would enable network interface drivers to be added or replaced without requiring software changes the storage application.

SUMMARY OF THE INVENTION

The various embodiments of the present invention have been developed in response to the present state of the art, and in particular, in response to the problems and needs in the art that have not yet been met for isolating storage applications from network interface drivers. Accordingly, the various embodiments have been developed to provide an apparatus, system, and method for isolating a storage application from a network interface driver that overcomes many or all of the above-discussed shortcomings in the art.

An apparatus according to one embodiment of the present invention includes a definition module, an application interface, a driver interface, a translation module and a data buffer. The definition module defines a set of storage application functions and a set of network interface driver functions. The application interface exchanges messages with a storage application using the storage application functions defined by the definition module. Preferably the messages are SCSI commands. The driver interface exchanges messages with a network interface driver using the network interface driver functions defined in by the definition module. Preferably the messages are SCSI commands.

The translation module translates each storage application function call received by the application interface into one or more network interface driver function calls. Similarly, the translation module translates each network interface driver function call received by the driver interface into one or more storage application function calls. A data buffer transfers data blocks between the storage application and the network interface driver. Preferably the data blocks comprise SCSI data blocks.

Preferably the driver interface is able to exchange messages with a plurality of network interface drivers. The network interface drivers are preferably Storage Area Network (SAN) interface drivers for a plurality of SAN protocols such as Fibre Channel Protocol for SCSI (FCP), iSCSI, and the like.

In certain embodiments the storage application may be replaced, by an upgrade, downgrade, or similar operation, without requiring any changes to the network interface driver. Similarly, the network interface driver may be replaced, by an upgrade, downgrade, or similar operation, without requiring any changes to the storage application.

The present invention also includes embodiments arranged as a system and machine-readable instructions that comprise substantially the same functionality as the components and steps described above in relation to the apparatus. Embodiments of the present invention provide a generic storage application isolation solution that uses an isolation module to separate a storage application from a network interface driver. The features and advantages of different embodiments will become more fully apparent from the following description and appended claims, or may be learned by the practice of embodiments of the invention as set forth hereinafter.

BRIEF DESCRIPTION OF THE DRAWINGS

In order that the advantages of the different embodiments of the invention will be readily understood, a more particular description of the embodiments briefly described above will be rendered by reference to specific embodiments that are illustrated in the appended drawings. Understanding that these drawings depict only typical embodiments of the invention and are not therefore to be considered to be limiting of its scope, the embodiments will be described and explained with additional specificity and detail through the use of the accompanying drawings, in which:

FIG. 4A is a chart illustrating an example set of storage application functions and network interface driver functions in accordance with the present invention;

FIG. 4B is a chart illustrating an example set of registered storage application functions and registered network interface driver functions in accordance with the present invention;

DETAILED DESCRIPTION OF THE INVENTION

Figure 1:
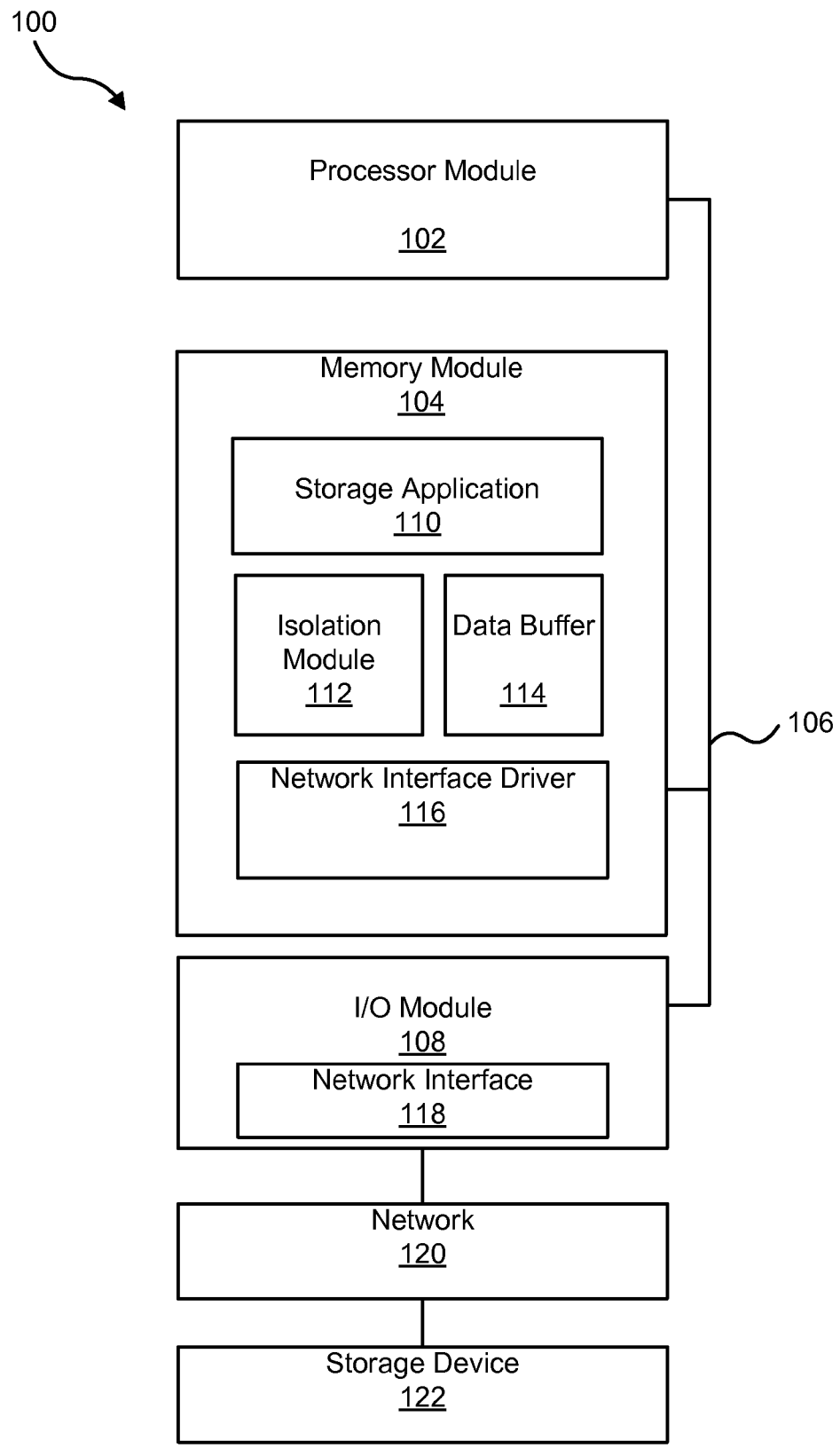
FIG. 1 is a schematic block diagram illustrating one embodiment of a system for isolating a storage application from a network interface driver in accordance with the present invention.

It will be readily understood that the components of embodiments of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the embodiments of the invention can be practiced without one or more of the specific details, or with other methods, components, materials, etc. In other instances, well-known structures, materials, or operations are not shown or described in detail to avoid obscuring aspects of the various embodiments.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a system 100 for isolating a storage application from a network interface driver. The system 100 in the depicted embodiment includes a processor module 102 that executes instructions known as machine code. The processor module 102 retrieves the instructions from a memory module 104 using a bus 106. An Input/Output (I/O) module 108 connects the system 100 to a network.

The memory module 104 contains a storage application 110, a isolation module 112, a data buffer 114, and a network interface driver 116 in silicon memory devices, magnetic hard drives, or other volatile or non-volatile storage devices. The memory module 104 provides stored data to the processor module 102 by communicating with the processor module 102 via the bus 106.

The isolation module 112 comprises a set of machine code that may be executed by the processor module 102. The isolation module 112, along with the data buffer 114 isolates the storage application 110 from the network interface driver 116. The data buffer 114 transfers data blocks between the storage application 110 and the network interface driver 116.

The storage application 110 comprises a set of machine code that may be executed by the processor module 102. The storage application 110 issues storage commands to send data to a storage device 122 or retrieve data from the storage device 122. The storage device 122 comprises a hard disk drive, disk array, tape drive or the like. Preferably the storage application 110 issues SCSI commands. The storage application 110 is typically a SCSI initiator, though the storage application 110 could also be a SCSI target.

The I/O module 108 typically comprises a storage device, monitor, and keyboard. The I/O module 108 could also include a printer, audio system, disk and tape drives, and the like. In addition, the I/O module 108 comprises a network interface 118 that physically connects the I/O module 108 to a network 120.

The network 120 may comprise a plurality of switches, bridges, routers and the like. The network 120 comprises a protocol used by the plurality of the switches in the network, the network interface 118, and the storage device 122. Preferably the network 120 uses a protocol that may transport SCSI commands. The network 120 may use Fibre Channel based protocols such as Fibre Channel Protocol for SCSI (FCP). Additionally, the network 120 may use other protocols such as Internet Protocol (IP), Infiniband, and the like.

The network interface driver 116 comprises a set of machine code that may be executed by the processor module 102. The network interface driver 116 adapts storage commands issued by the storage application 110 to a format suitable for transmission on the network 120 by the network interface 118. Preferably the network interface driver 116 adapts SCSI commands. The network interface driver 116 is typically a SCSI initiator, though the network interface driver 116 could also be a SCSI target. Alternatively the network interface driver 116 may be configured as both a SCSI initiator and a SCSI target.

The bus 106 is a general-purpose device for enabling communication between the memory module 104, processor module 102, and I/O module 108. The bus 106 may be a short distance bus, where each of the modules 102,104,108 are located in the same chassis, or may be a bus 106 that enables the modules 102,104,108 to be distributed. The bus 106 may comprise various media including: wired, wireless, copper, fiber optics, and the like.

Figure 2:
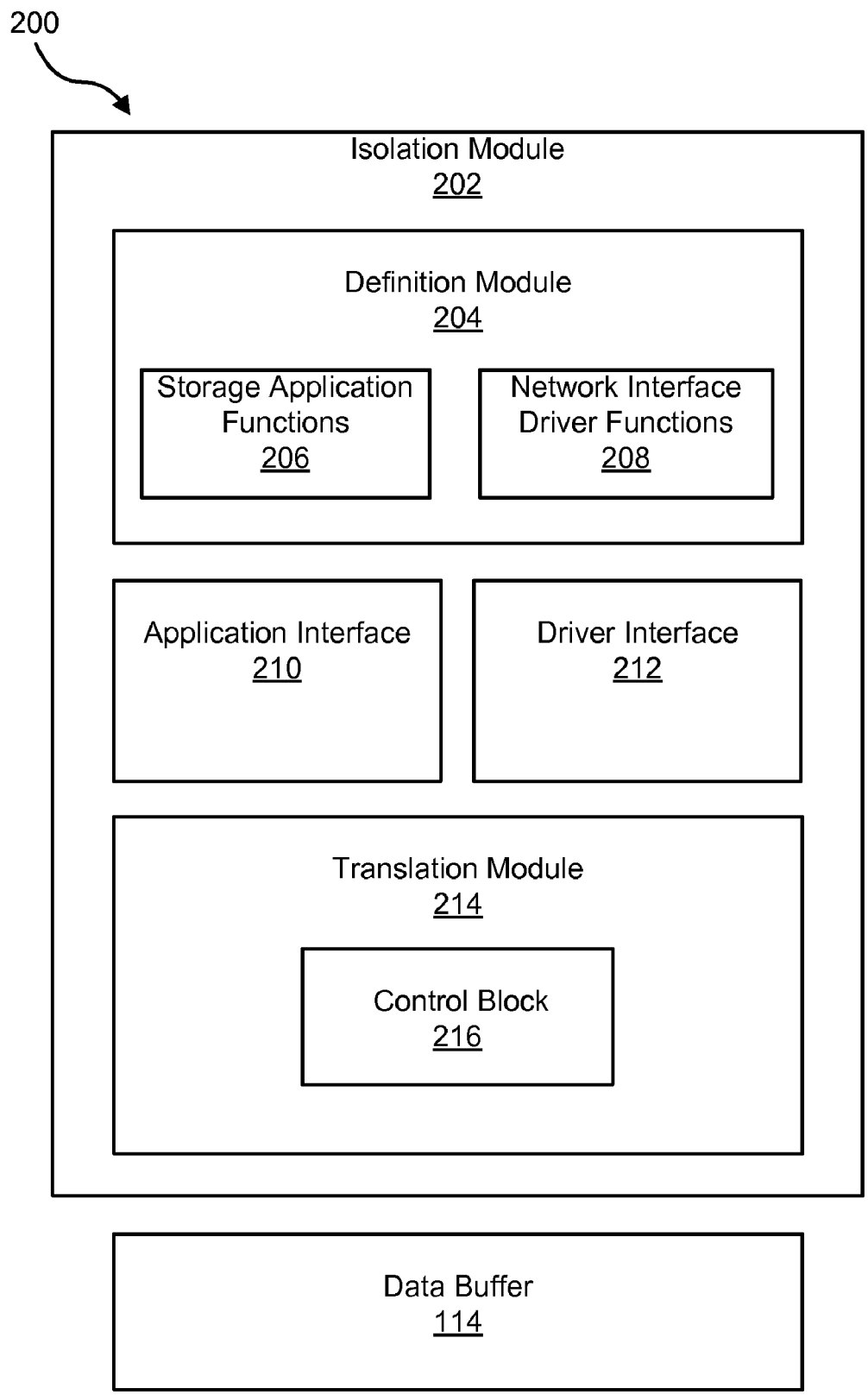
FIG. 2 is a schematic block diagram illustrating one embodiment of an apparatus for isolating a storage application from a network interface driver in accordance with the present invention.

FIG. 2 illustrates an apparatus 200 for isolating a storage application 110 from a network interface driver 116. The apparatus 200 in the depicted embodiment comprises an isolation module 202 and a data buffer 114. The isolation module 202 includes a definition module 204 configured to define a set of storage application functions 206 and a set of network interface driver functions 208.

An application interface 210 utilizes the storage application functions 206 to exchange messages with the storage application 110. Similarly, a driver interface 212 utilizes the network interface driver functions 208 to exchange messages with the network interface driver 116.

A translation module 214 translates each of the storage application functions 206 called by the storage application 110 to one or more network interface driver functions 208 called by the driver interface 212. Similarly, the translation module 214 translates each of the network interface driver functions 208 called by the network interface driver 116 to one or more storage application functions 206 called by the application interface 210.

The translation module 214 uses a control block 216 specified as a parameter of a storage application function 206 or a network interface driver function 208 to specify a storage command, preferably a SCSI command, as well as a memory location to be used by the data buffer 114. The data buffer 114 transfers data blocks between the storage application 110 and the network interface driver 116 through a data buffer specified by the control block 216.

Figure 3:
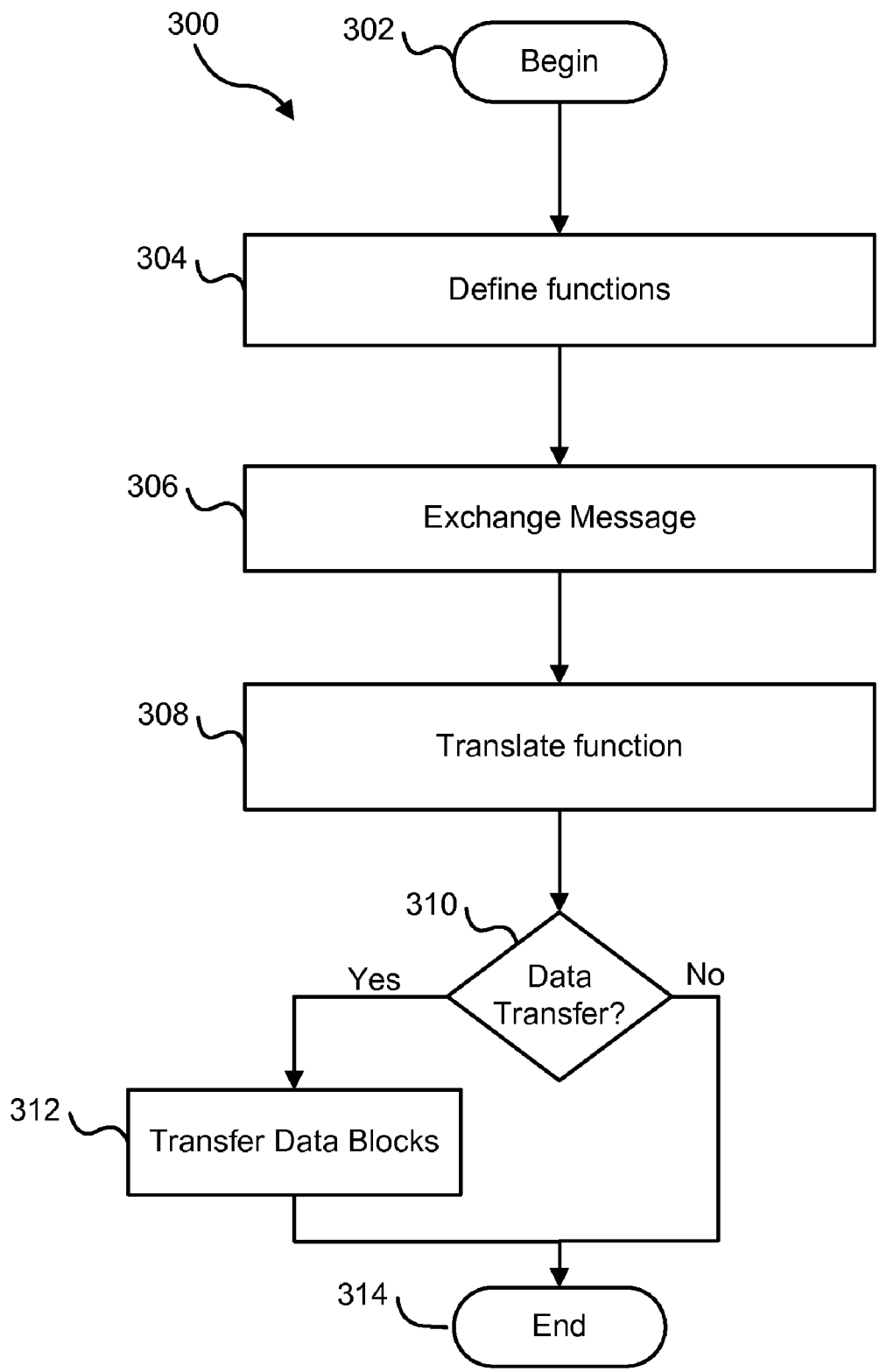
FIG. 3 is a schematic block diagram illustrating one embodiment of a method for isolating a storage application from a network interface driver in accordance with the present invention.

FIG. 3 illustrates one embodiment of a method 300 for isolating a storage application 110 from a network interface driver 116. The method 300 begins 302 when the definition module 204 (see FIG. 3) defines 304 a set of storage application functions 206 and a set of network interface driver functions 208. The functions 206,208 comprise a function name, one or more parameters, and a result. The storage application functions 206 are used to exchange messages between the storage application 110 and the application interface 210. The network interface driver functions 208 are used to exchange messages between the network interface driver 116 and the driver interface 212.

The storage application functions 206 comprise isolation layer defined functions and storage application defined functions. The isolation layer defined functions are called by the storage application 110 and enable communication between the storage application 110 and the application interface 210. The names and parameters of the isolation layer defined functions are fixed at the time the isolation module 202 is created. A list of the isolation layer defined functions is available to a programmer who writes the storage application 110.

The definition module 204 also defines storage application defined functions. However, the definition module 204 does not specify the names of the storage application defined functions. The programmer of the storage application 110 may specify names for the storage application defined functions by registering the names with the definition module 204. The storage application defined functions are called by the application interface 210 and enable communication between the application interface 210 and the storage application 110.

Similarly, the network interface driver functions 208 comprise isolation layer defined functions and network interface driver defined functions. The isolation layer defined functions are called by the network interface driver 116 and enable communication between the network interface driver 116 and the driver interface 212. The names and parameters of the isolation layer defined functions are fixed at the time the isolation module 202 is created. A list of the isolation layer defined functions is available to a programmer who writes the network interface driver 116.

The definition module 204 also defines network interface driver functions. However, the definition module 204 does not specify the names of the network interface driver defined functions. The programmer of the network interface driver 116 may specify names for the network interface defined functions by registering the names with the definition module 204. The network interface defined functions are called by the driver interface 212 and enable communication between the driver interface 212 and the network interface driver 116.

In one embodiment of the present invention, the storage application 110 may act as a SCSI initiator, a SCSI target, or both. The storage application 110 specifies which SCSI mode (initiator, target, both) will be used by calling a registration function that is sent to the application interface 210. The storage application 110 specifies the storage application defined function names in the registration function. Similarly, the network interface driver 116 specifies which SCSI mode (initiator, target, both) will be used by calling a registration function that is sent to the driver interface 212. The network interface driver 116 specifies the network interface driver defined function names in the registration function.

Next, the storage application 110 utilizes the defined storage application functions 206 described above to exchange 306 messages with the application interface 210. Similarly, the network interface driver 116 utilizes 306 the defined network interface driver functions 208, also described above, to exchange messages with the driver interface 212. The messages exchanged comprise function calls using the defined functions 206,208.

Conventional storage applications 110 use function calls to communicate directly with a network interface driver 116. An embodiment of the present invention inserts an isolation module 202 between the storage application 110 and the network interface driver 116 so rather than directly interacting with the network interface driver 116, the storage application 110 now interacts with an application interface 210. Similarly, the network interface driver 116 interacts with a driver interface 212, rather than directly with the storage application 110.

Establishing rules of interaction (by defining the storage application functions 206 and network interface driver functions 208) between the storage application 110, isolation module 202, and network interface driver 116 enables isolation of the storage application 110 and the network interface driver 116. Communication may still take place between the storage application 110 and network interface driver 116, but the isolation module 202 now facilitates the communication via the application interface 210 and driver interface 212. The separation of the storage application 110 and network driver interface 116 is desirable since the storage application 110 may be replaced or modified without impacting the network interface driver 116 as long as the replacement storage application 110 uses the established storage application functions 206. The network interface driver 116 may similarly be replaced or modified without impacting the storage application 110.

In order for messages to get from the storage application 110 to the network interface driver 116, the translation module 214 translates 308 storage application function 206 calls to network interface driver function 208 calls and network interface driver function 208 calls to storage application function 206 calls. The translation module 214 uses a control block 216 to convey a message, preferably a SCSI command, from the storage application 110 to the network interface driver 116.

The control block is a data structure that includes a message, preferably a SCSI command, a pointer to a data buffer, status information, and a completion function. The storage application 110 acting as a SCSI initiator issues a SCSI command to a storage device 122 acting as a SCSI target by placing the SCSI command in a control block 216. A storage application function 206 passes the control block 216 to the application interface 210 as a parameter. A unique control block 216 may be allocated for each SCSI command.

The translation module maps the storage application function 206 call to a network interface driver function 208 call that is sent to the network interface driver 116 with the control block 216 as a parameter of the function call. The network interface driver 116 extracts the SCSI command from the control block 216 and then sends the SCSI command to the storage device 122 through the network 120. Similarly, a SCSI command may be conveyed from the network interface driver 116 to the storage application 110 using a control block 216.

The translation module 214 translates a storage application function 206 to network interface driver function 208 by mapping the storage application function 206 to a corresponding network interface driver function 208. FIG. 4A illustrates a typical table 400 used for mapping functions 206,208. Storage application functions 206 are shown in the left column of the figure and network interface driver functions 208 are shown in the right column of the figure. Each function may include a function name 402 and one or more parameters 404.

Isolation layer defined functions 406 have fixed function names 402 as discussed above. An unregistered storage application defined function 408 is illustrated. Note that the storage application defined function 408 does not have a fixed function name 402 as indicated by the parenthesis. The application interface 210 typically cannot call unregistered storage application defined functions 408 since they do not have valid function names 402. The storage application 110 specifies a function name 402 for the storage application defined function 408 when registering with the definition module 204. Unregistered network interface defined functions 410 are also illustrated.

FIG. 4B illustrates a table 411 of registered versions of the functions shown in FIG. 4A. A registered storage application defined function 412 is illustrated. Note that the storage application 110 specified "drvr_target command_rx" as a function name 402 when registering the function 412. Any function name 402 could have been registered by the storage application 110. The storage application 100 registered the storage application defined function 412 with the definition module 204. The application interface 210 may now call this registered storage application defined function 412. Registered network interface defined functions 414 are also illustrated. The functions 406,408,410 illustrated in FIGS. 4A-B and their parameters 404 are typical of an embodiment of the present invention. However, additional or different functions may also be used.

FIG. 4B also illustrates a mapping used by the translation module 214 when mapping storage application functions 206 to network interface driver functions 208. For example, if the storage application 110 calls the "app_start_initiator_scsi_cmd" function the translation module 214 translates the storage application function 206 "app_start_initiator_scsi_cmd" to the network interface driver function 208 "drvr_initiator_scsi_cmd". The driver interface 212 then calls the "drvr_initiator_scsi_cmd". The network interface driver 116 receives the "drvr_initiator_scsi_cmd" function call and takes appropriate action.

Note that a control block 216 is specified as a parameter of the "app_start_initiator_scsi_cmd" and "drvr_initiator_scsi_cmd" function calls. The control block 216 carries the actual message, preferably a SCSI command. In this manner a SCSI command may be sent by the storage application 110 and received by the network interface driver 116. In this example the "app_start_initiator_scsi_cmd" storage application function 206 is mapped to the "drvr_initiator_scsi_cmd" network interface driver function 208. Similar mappings are also illustrated in FIG. 4B where each row in the figure represents a mapping. The figure illustrates mappings from a single storage application function 206 to a single network interface driver function 208. However, a single storage application function 206 could also be mapped to a plurality of network interface driver functions 208.

The translation module 214 similarly maps network interface driver functions 208 to storage application functions 206. For example, if the network interface driver 116 calls the "app_target_command_rx" function the translation module 214 translates the network interface driver function 208 "app_target_command_rx" to the storage application function 206 "drvr_target_command_rx". The application interface 210 then calls the "drvr_target_command_rx". The storage application 110 receives the "drvr_target_command_rx" function call and takes appropriate action.

Note that as discussed above, the storage application 110 may call isolation layer defined functions 406 if they are storage application functions 206. Similarly, the network interface driver 116 may call isolation layer defined functions 406 if they are network interface driver functions 208. Isolation layer defined functions 406 typically are not called by the application interface 210 or the driver interface 212. Storage application defined functions 408 may be called by the application interface 210 and are not typically called by the storage application 110. Similarly, network interface defined functions 410 may be called by the driver interface 212 and are not typically called by the network interface driver 116.

Referring now to FIG. 3, the network interface driver 116 receives a function call from the driver interface 212 and examines the message, preferably a SCSI command, in the control block 216 specified by the function call. The network interface driver 116 determines 310 if a data transfer from the storage application 110 to the network interface driver 116 is required. If a data transfer is necessary, the network interface driver 116 transfers the data blocks, preferably SCSI data blocks, to the storage device 122 by retrieving the data blocks from the data buffer 114 specified in the control block 216 supplied by the function call and the method ends 314. If no data transfer is necessary, the method ends 314.

The data buffer 114 comprises physical memory in the memory module 104. The storage application 110 reserves the physical memory when the storage application 110 allocates a control block 216. A pointer to the data buffer 114 is one of the fields in the control block 216. The data buffer 114 is preferably used to transfer SCSI data blocks, not SCSI commands, between the storage application 110 and the network interface driver 116. The isolation module 202 typically does not inspect or use the data blocks placed in the data buffer 114.

If data is being transferred from the storage application 110 to the network interface driver 116 the storage application 110 allocates the data buffer 114 referred to by the control block 216 and places the data in the data buffer 114. The network interface driver 116 retrieves the data from the data buffer 114 (specified in the control block 216) and sends the data to the storage device 122. If data is being transferred from the network interface driver 116 to the storage application 110 then the network interface driver 116 allocates the data buffer 114 referred to in the control block 216 and places data received from the storage device 122 in the data buffer 114. The storage application 110 then retrieves the data from the data buffer 114.

Preferably the control block 216 specifies a completion function. The network interface driver 116 calls the completion function once the SCSI command specified in the control block 216 is complete. The storage application 110 receives the completion function call. This feedback mechanism allows the storage application 110 to track of the state of the SCSI command specified in the control block 216.

Figure 5:
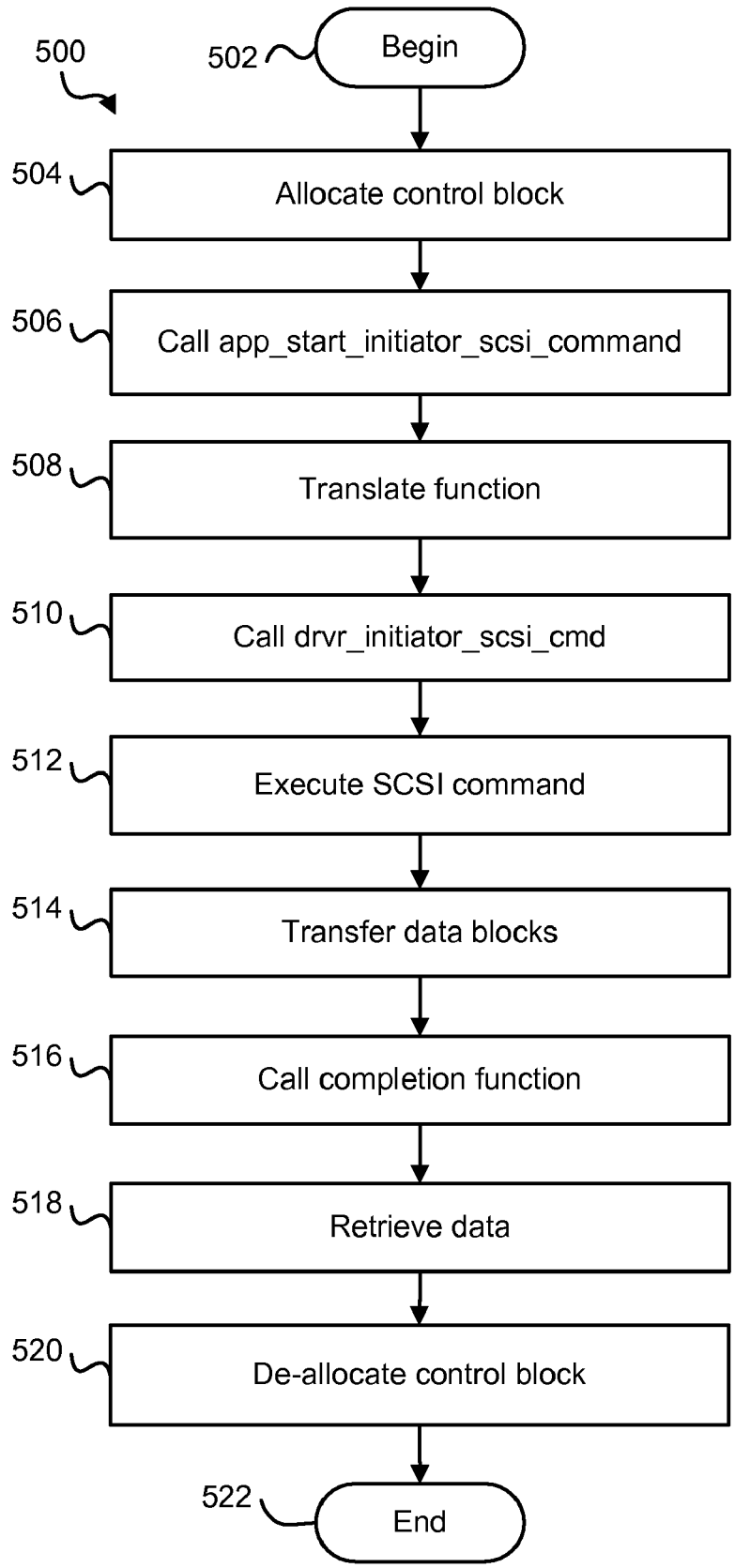
FIG. 5 is chart representing an example of a method for sending a SCSI command from a storage application to a storage device in accordance with the present invention.

FIG. 5 illustrates one embodiment of a method 500 for isolating a storage application 110 from a network interface driver 116. In this embodiment messages sent by the storage application 110 and network interface driver 116 comprise SCSI commands. The method 500 illustrates a SCSI command sent by a storage application 110 configured as a SCSI initiator to a storage device 122 configured as a SCSI target.

The method begins 502 when the storage application 110 allocates 504 a control block 216. The storage application 110 references a SCSI command to retrieve data from the storage device 122 in the control block 216. Additionally the storage application 110 references a data buffer 114 into which the network interface driver 116 may place the data in the control block 216. Next the storage application 110 calls 506 the "app_start_initiator_scsi_command" storage application function 206 with the control block 216 as a parameter. The application interface 210 receives the function call. The translation module 214 translates 508 the "app_start_initiator_scsi_command" storage application function 206 call to a "drvr_initiator_scsi_cmd" network interface driver function 208 by referring to the mapping illustrated in FIG. 4B.

Next, the driver interface 212 calls 510 the "drvr_initiator_scsi_cmd" network interface driver function 208 with the control block 216 as a parameter. The network interface driver 116 receives the function call. The network interface driver 116 extracts the SCSI command in the control block 216 and executes 512 the SCSI command. The storage device 122 receives the SCSI command and sends the requested data to the network interface driver 116.

The network interface driver 116 transfers 514 the data received from the storage device 122 to the data buffer 114 specified by the storage application 110 in the control block 216. The network interface driver 116 then calls 516 the completion function specified by the storage application 110 in the control block 216. The storage application 110 receives the completion function call and retrieves 518 the data from the data buffer 114. The storage application 110 then de-allocates 520 the control block so that the physical memory comprising the data buffer 114 is freed. The method ends 522.

Figure 6:
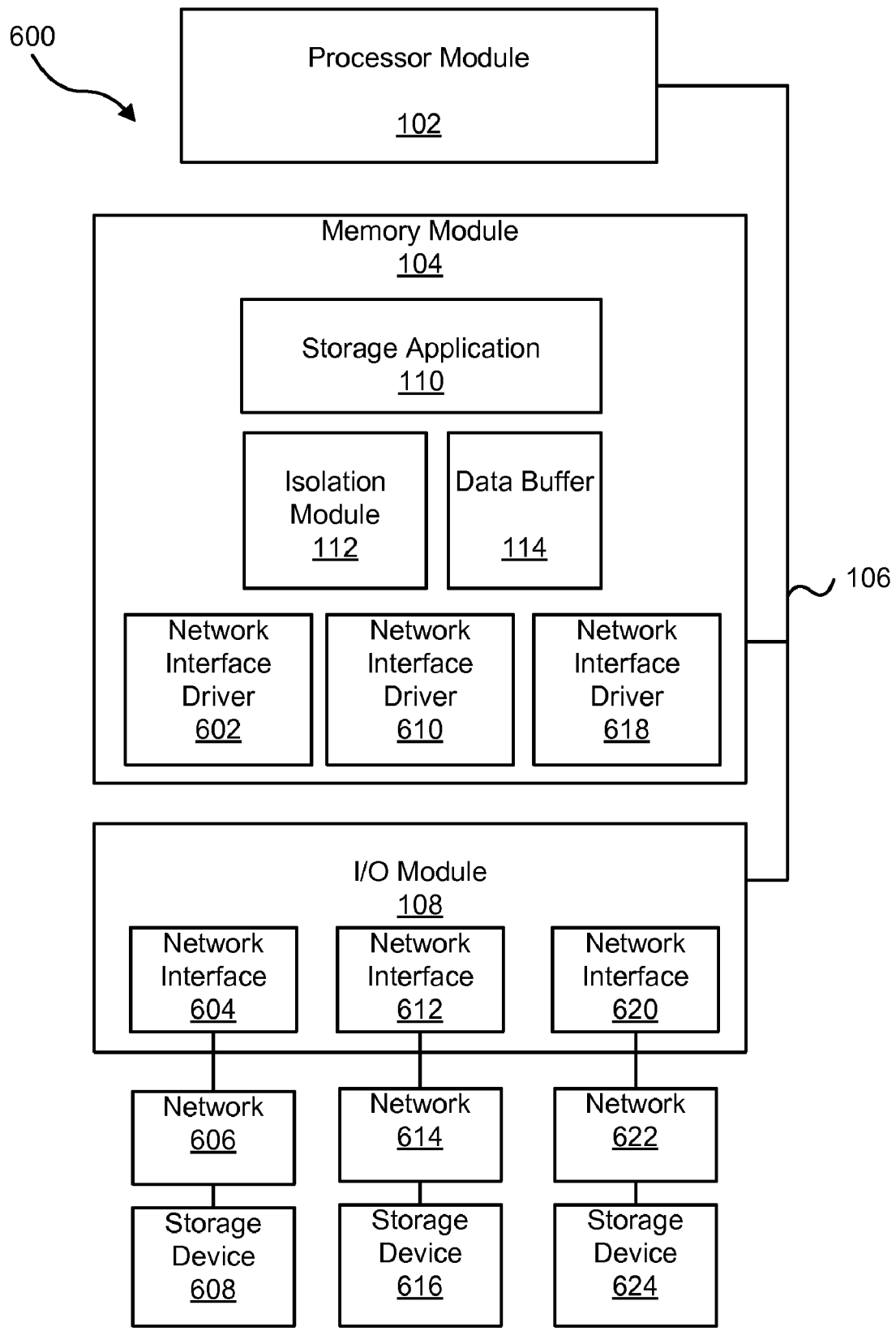
FIG. 6 is a schematic block diagram illustrating another embodiment of a system for isolating a storage application from a network interface driver in accordance with the present invention.

FIG. 6 illustrates another embodiment of a system 600 for isolating a storage application 110 from a network interface driver 116. The system 600 comprises a processor module 102, memory module 102, storage application 110, isolation module 112, data buffer 114, I/O module 108, and bus 106 substantially the same as the system 100 of FIG. 1.

In this embodiment a first network interface driver 602 couples a first network interface 604 to a first network 606 and a first storage device 608. Similarly, a second network interface driver 610 couples a second network interface 612 to a second network 614 and a second storage device 616 and a third network interface driver 618 couples a third network interface 620 to a third network 622 and a third storage device 624.

The use of a plurality of network interface drivers 602, 610, 618 enables the storage application 110 to communicate with a plurality of storage devices 608, 616, 624 each connected to a network 606, 614, 622 using a different SAN protocol. The use of different SAN protocols by the networks 606, 614, 622 is transparent to the storage application 110 since the storage application 110 need only communicate with the isolation module 202. Each of the network interface drivers 602, 610, 618 uses the network interface driver functions 208 defined by the definition module 204. The ability to isolate the use of different SAN protocols from the storage application 110 enables easy adoption of new SAN protocols and the benefits associated with the new SAN protocols.

The embodiments of the present invention may be embodied in other specific forms without departing from its spirit or essential characteristics. The described embodiments are to be considered in all respects only as illustrative and not restrictive. The scope of different embodiments of the invention is, therefore, indicated by the appended claims rather than by the foregoing description. All changes which come within the meaning and range of equivalency of the claims are to be embraced within their scope.

What is claimed is:

1. An apparatus comprising a non-transitory computer-readable storage medium for providing an independent interface to update a function of a storage application independent from the storage application, and to update a function of a network interface driver independent from the network interface driver, the apparatus comprising:

an isolation module stored on a storage device, the isolation module to isolate the storage application from the network interface driver communicatively connecting a host computing device to a network interface device, the network interface device providing a physical connection to a storage area network (SAN) switch that connects the host computing device to a storage device, the isolation module configured to:

receive a storage application function call from the storage application;

translate the storage application function call to a corresponding network interface driver function call;

invoke the corresponding network interface driver function call of the network interface driver in response to receiving the storage application function call from the storage application; and transfer data blocks between the storage application and the network interface driver through a data buffer.

2. The apparatus of claim 1, the isolation module further comprising a driver interface configured to utilize the network interface driver functions to exchange messages with the network interface driver.

3. The apparatus of claim 1 wherein the network interface driver comprises a Storage Area Network (SAN) interface driver.

4. The apparatus of claim 2 wherein the driver interface exchanges messages with a plurality of network interface drivers.

5. A system comprising:

a processor configured to execute machine code;

an Input/Output (I/O) module configured to couple the system to a network;

a network interface driver communicatively connecting a host computing device to a network interface device, the network interface device providing a physical connection to a storage area network (SAN) switch that connects the host computing device to a storage device;

a storage application executing on the host computing device that stores data on the storage device;

an isolation module executing on the host computing device and configured to:

receive a storage application function call from the storage application;

translate the storage application function call to a corresponding network interface driver function call;

invoke the corresponding network interface driver function call of the network interface driver in response to receiving the storage application function call from the storage application; and transfer data blocks between the storage application and the network interface driver through a data buffer.

6. The system of claim 5, wherein the isolation module further comprises a driver interface configured to utilize the network interface driver functions to exchange messages with the network interface driver.

7. The system of claim 5, wherein the network interface driver comprises a Storage Area Network (SAN) interface driver.

8. The system of claim 6, wherein the driver interface exchanges messages with a plurality of network interface drivers.

9. The system of claim 5, wherein the storage application may be replaced without impacting the network interface driver.

10. The system of claim 5, wherein the network interface driver may be replaced without impacting the storage application.

11. The system of claim 5, wherein the messages comprise SCSI commands.

12. The system of claim 5, wherein the data blocks comprise SCSI data blocks.

13. A non-transitory computer-readable storage medium tangibly embodying a program of computer-readable instructions executable by a digital processing apparatus to perform operations, the operations comprising:

isolating the storage application from a network interface driver communicatively connecting a host computing device to a network interface device, the network interface device providing a physical connection to a switch that connects the host computing device to a storage device, thereby providing an isolation layer;

receiving a storage application function call from the storage application to communicate a message to the network interface device;

translating the storage application function call to a corresponding network interface driver function call;

invoking the corresponding network interface driver function call of the network interface driver to communicate the message in response to receiving the storage application function call from the storage application; and transferring data blocks between the storage application and the network interface driver through a data buffer.

14. The computer-readable storage medium of claim 13, wherein the network interface driver comprises a Storage Area Network (SAN) interface driver.

15. The computer-readable storage medium of claim 13, wherein the storage application exchanges messages with a plurality of network interface drivers through the isolation layer.

16. The computer-readable storage medium of claim 13, wherein the storage application may be replaced without impacting the network interface driver.

17. The computer-readable storage medium of claim 13, wherein the network interface driver may be replaced without impacting the storage application.

18. The computer-readable storage medium of claim 13, wherein the messages comprise SCSI commands.

19. The computer-readable storage medium of claim 13, wherein the data blocks comprise SCSI data blocks.

20. An apparatus comprising:
a processor configured to execute machine code;
an isolation module comprising instructions for:
defining a set of storage application functions;
defining a set of network interface driver functions;
receiving a storage application function call from a storage application executing on a host computing device;
translating the storage application function call to a corresponding network interface driver function call;
invoking the corresponding network interface driver function call of a network interface driver in response to receiving the storage application function call from the storage application, wherein the network interface driver communicatively connects the host computing device to a network interface device that provides a physical connection to a switch that connects the host computing device to a storage device; and
transferring data blocks between the storage application and the network interface driver through a data buffer.

21. The apparatus of claim 20, wherein the network interface driver comprises a Storage Area Network (SAN) interface driver.

22. The apparatus of claim 20, wherein the storage application exchanges messages with a plurality of network interface drivers through the isolation module.

23. The apparatus of claim 1, wherein the isolation module comprises a software isolation layer to allow continued functionality between the storage application and a plurality of existing network interface drivers after an addition of another network interface driver and before an update to the storage application.

24. The system of claim 5, wherein the isolation module further comprises a software isolation layer to allow continued functionality between the storage application and a plurality of existing network interface drivers after an addition of another network interface driver and before an update to the storage application.

25. The computer-readable storage medium of claim 13, wherein the operations further comprise allowing continued functionality between the storage application and a plurality of existing network interface drivers after an addition of another network interface driver and before an update to the storage application.

26. The apparatus of claim 20, wherein the apparatus further comprises a software isolation layer allowing continued functionality between the storage application and a plurality of existing network interface drivers after an addition of another network interface driver and before an update to the storage application.

* * * * *